United States Patent Office 3,442,888
Patented May 6, 1969

---

3,442,888
SUCROSE - GLYCEROL - ALKYLENEOXIDE POLYOL COMPOSITIONS AND PROCESS FOR PREPARING SAME
Edward R. Degginger and Robert E. Booth, Syracuse, N.Y., assignors to Allied Chemical Corporation, New York, N.Y., a corporation of New York
No Drawing. Original application May 17, 1962, Ser. No. 195,646. Divided and this application Dec. 14, 1965, Ser. No. 513,824
Int. Cl. C08g 23/10, 22/14
U.S. Cl. 260—209       3 Claims

ABSTRACT OF THE DISCLOSURE

This invention relates to sucrose-glycerol polyols prepared by admixing sucrose with glycerol in the proportion of 210 to 550 parts by weight sucrose per 100 parts of glycerol and passing propylene oxide through said mixture until about 570 to 1900 parts by weight propylene oxide per 100 parts by weight glycerol are reacted to produce a polyether containing an average of 1.2 to 2 molecules propylene oxide reacted with each hydroxyl of the sucrose and glycerol. The sucrose-glycerol polyols are useful in the production of rigid urethane foam. This is a divisional application of our co-pending application, Ser. No. 195,646, filed May 17, 1962, now abandoned.

---

Polyether-urethane foams are expanded cellular materials formed by reacting a polyether glycol with an aromatic polyisocyanate usually tolylene diisocyanate. These closed-cell rigid urethane foams are particularly useful for foamed-in-place applications such as thermal insulation, sandwich construction, building panels, flotation chambers in ships, and numerous other structural parts. To meet the requirements of these applications, the foamed product must possess outstanding chemical, physical and mechanical properties. The physical characteristics and mechanical properties of the foam are primarily controlled by the structure and molecular size of the polyether. Many of the rigid foam grade polyethers offered on the market have been based on trihydroxy compounds such as trimethylolpropane and trishydroxyphenylpropane. In the foaming reaction with diisocyanate these low molecular weight triols produce rigid foams. Such foams have inferior dimensional stability in humid heat tests and exhibit a tendency to melt when burned. This property causes dripping and spreads flaming polymer increasing the fire hazard. To some extent the quality of the rigid polyether-urethane foam was improved by increasing the degree of crosslinking by chemical bonds. Considerable investigation was carried out in an effort to develop polyethers which will give urethane foams having the desired properties but unfortunately in instances where polyethers were found which produced improved foams, the cost of such special polyethers was high thereby restricting their commercial utility. Sorbitol initiated polyethers are an example.

Sucrose would appear to be an ideal starting material for the production of polyethers for use in the manufacture of rigid foams in that sucrose structurally has a large number of hydroxyl groups i.e. high functionality. There are eight hydroxyl groups per molecule. Sucrose is readily available in highly purified form at a very low cost. A sucrose polyether was prepared by reaction with propylene oxide but unfortunately when this polyether material is used alone in foam formulations with diisocyanate an extremely brittle and powdery material, unacceptable for rigid foams is produced. Recently, U.S. Patent 2,990,376 issued July 27, 1961, suggested sucrose as the initiator in the preparation of polyether for use in foam manufacture. The patentees found as did others that sucrose polyethers alone were unsuitable for production of urethane foams but they were able to produce a polyether composition by incorporating limited amounts of a specific sucrose polyether in a glycerol polyether which was now suitable for rigid urethane foam. As stated in the patent, for every mole of glycerol polyether the maximum amount of sucrose polyether which could be tolerated was less than ½ mole. When one considers that the price of glycerol is about four times the price of sucrose, the economic importance of employing a higher proportion of sucrose to glycerol is self-evident. Further as pointed out in the patent it was necessary to prepare the specific compound octakis (2-hydroxypropyl) sucrose and the preparation of this specific compound required special conditions involving a specific catalyst, namely a tertiary amine free of labile hydrogen which was capable of adding one and only one hydroxypropyl group to each sucrose hydroxyl group. Thus sucrose polyether for preparation of compositions for the manufacture of urethane foams of desirable properties were required to be the uniformly hydroxypropylated octakis (2-hydroxypropyl) sucrose. This requirement was claimed to impart the requisite properties to the urethane foam.

An object of the present invention is to provide a rigid closed-cell urethane foam having exceptional, desirable properties made from low cost sucrose-glycerol based polyethers. Another object is to provide a polyether composition suitable for producing rigid foams with excellent dimensional stability and containing a higher portion of low cost sucrose. A further object is to provide a novel method for preparing a polyether composition containing both sucrose and glycerol suitable for use in the production of dimensionally stable rigid foams. A still further object is to provide a method of producing rigid closed-cell foams having exceptional desirable properties by reaction of sucrose-glycerol polyether with diisocyanate. Other objects and advantages will be apparent from the following description.

In accordance with the present invention a sucrose containing polyether composition adapted for the production of rigid closed-cell urethane foams having exceptional desirable properties may be prepared by admixing sucrose with glycerol in the proportion of 550–210 parts by weight sucrose per 100 parts by weight glycerol, preferably 375–270 parts by weight sucrose per 100 parts by weight glycerol, 0–1 percent water by weight of the reactants, passing propylene oxide in direct contact with said mixture of sucrose and glycerol in the presence of an alkali metal hydroxide catalyst, preferably potassium hydroxide, while maintaining the reaction mixture within the range of 50–150° C., preferably 60–95° C. and continuing the reaction until 1900–570 parts by weight propylene oxide are reacted with the mixture of sucrose and glycerol to produce a polyether containing an average of 2.0–1.2 molecules propylene oxide reacted with each OH group.

The foams produced from the sucrose-glycerol based polyethers using the usual grade of diisocyanate are high quality, having physical properties equal to or exceeding foams from other sources. The foams are unaffected by fats, grease and oils. They have no nutritive value and consequently are not attacked by rodents and insects. The foams produced from these sucrose-glycerol polyethers have eminently desirable, yet uncommon characteristics when subject to fire—they are non-melting. Like other rigid urethane foams, they are combustible; however, their unique non-melting property prevents the dripping of flaming melted polymer when burned. The heat of a flame is necessary to start the burning.

The sucrose polyethers of the present invention may be prepared by charging a reactor with glycerin and a small amount of potassium hydroxide catalyst, generally about ½ part to about 5 parts measured as potassium, per 100 parts by weight glycerin and then incrementally adding sucrose to the glycerin in the reactor while agitating the contents. Charging of the sucrose can usually be accomplished in 30–60 minutes or less with rapid mechanical agitation. The amount of sucrose introduced into the reactor is substantially greater than the amount of glycerin, typically about 325 pounds of sucrose for every 100 pounds of glycerin. Propylene oxide is introduced into the mixture of sucrose, glycerin and catalyst and reacts therein to form the polyether composition. Quantity of propylene oxide is typically about 1100 pounds propylene oxide per 100 pounds glycerin. The reaction is initiated at a relatively low temperature and proceeds at an appreciable rate at a temperature as low as 50° C. Higher temperatures up to 150° may be employed if a more rapid rate of reaction is desired. At the higher temperatures the operation is completed in a relatively short time of several hours about 4–10 hours and at lower temperatures the time is generally about 30–40 hours. The operation may be conveniently carried out under substantially atmospheric pressure although superatmospheric pressure may be employed if desired. The reactivity of the propylene oxide with the sucrose and glycerol is quite rapid such that usually all the propylene oxide introduced into the reaction mixture is absorbed. In the preparation of polyethers of the present invention no water is required and indeed an amount of water in excess of 1 percent by weight based on the weight of the reactants has a detrimental effect on the product. Small amounts of water can be tolerated but it is desirable to keep the total quantity of water based on the weight of the reactants below ¼ of 1 percent.

The apparatus for carrying out the reaction producing the polyethers of the present invention may take several forms. In one procedure the polyethers can be prepared in a vertical column reactor into which was charged glycerin and the potassium hydroxide catalyst. As a matter of convenience the KOH is generally first dissolved in enough water to prepare a 50 percent solution and this solution added to the glycerin. The mixture in the column is heated and at a low temperature of about 50° C. propylene oxide feed was started with introduction through the bottom of the reactor. This gave the necessary agitation due to the turbulence of the rising propylene oxide vapor. Dry crystalline sucrose was then added at a rate that enabled the agitation to maintain a slurry and prevent the settling of sucrose. Temperature is leveled off at 80° C., by control of the external heaters on the vertical reactor, and the sucrose addition was generally completed in less than about 60 minutes. Thereafter the temperature was permitted to increase gradually to about 95° C. and maintained at that temperature. The propylene oxide addition is continued until the desired amount has been added. This can be determined by actual measurement of the volume of polyether during the course of the reaction. The time required was about 35 hours. The crude polyether was then cooled to 25 to 35° C. and neutralized to a pH between 4.5–5 with 37 percent aqueous HCl. The mixture was filtered to separate the precipitated KCl. The clear filtrate was heated to 100–115° C. and stripped with a stream of nitrogen to a constant pH which indicates that all volatiles have been removed.

In another procedure, a kettle reactor was charged with KOH pellets held in a basket within the reactor and so positioned that a circulating stream impinged upon the basket. Glycerin was then added and the charge kept at 80° to 100° C. by means of a heat exchanger and a pump circulating liquor thru the heat exchanger. This pump also provided the agitation in the reactor. Sugar was then added incrementally at such a rate that circulation could be maintained and a final thick slurry was obtained about like toothpaste. This generally required about 1 hour. The reactor was then purged with nitrogen. Propylene oxide was added and the temperature of the reaction mass was maintained at 100 to 120° C. at pressures up to 20 p.s.i.g. Time of addition was 6 to 18 hours depending upon the hydroxyl number desired. Cooling was done by circulating thru a heat exchanger or by vaporizing an excess feed of propylene oxide thru the reaction mixture. After the desired hydroxyl number had been reached, as determined by actual test or on the basis of the weights of ingredients added, the crude polyether was cooled to 30 to 40° C. and neutralized to a pH between 4.5 and 6 with 25% aqueous HCl. The mixture was digested for 1 to 4 hours to assist in coagulation of KCl, with about 0.2 percent filter aid present. It was filtered thru a plate and frame filter press. The clear filtrate was heated to 110–115° C. and stripped of volatiles using nitrogen gas in a bubble cap column until the water content was reduced to the desired level (usually about 0.1 percent) as measured by the Karl Fisher method.

The polyethers of the present invention can be made with higher ratios of sucrose to glycerin without sacrificing dimensional stability in the rigid polyurethane produced therefrom. This results in a lower cost foam because sucrose is less expensive than glycerin. While we do not wish to predicate our invention on any theory, we believe there are several features which are important in enabling us to product a polyether composition having a high ratio of success to glycerin and yet retain desirable properties for foam manufacture. The polyethers of the present invention have more than one propylene oxide molecule per (OH) group and these propylene oxide groups are attached in a random, non-uniform manner as contrasted to the uniformly distributed 2-hydroxypropyl groups in the compound octakis (2-hydroxypropyl) sucrose, wherein each hydroxyl group is reacted with one and only one propylene oxide. In addition we employ a highly active catalyst, an alkali metal hydroxide specifically potassium hydroxide, which permits and induces more than one molecule on th eaverage to react with each hydroxyl group to produce the desired product. The average number of propylene oxide molecules reacting with each hydroxyl group is typically 1.5 and should not be below 1.2 or above 2.0. As previously mentioned the propylene oxide molecules are unevenly distributed and some of the OH groups may have reacted with 2-3 propylene oxide groups whereas other OH groups have reacted with only one propylene oxide group. This heterogeneous grouping of the propylene oxide molecules on the sucrose and glycerol results in a polyether composition which has distinct advantages which will now be discussed.

Conventional sucrose glycerol polyethers containing octakis (2-hydroxypropyl) sucrose require about 115 grams of tolylene diisocyanate per 100 grams of polyether to produce foam. Surprisingly, we have found that the sucrose-glycerol polyether composition of the present invention requires an appreciably smaller amount. About 100 parts of tolylene diisocyanate per 100 parts of polyether are required. This is about 15 percent less of tolylene diisocyanate to produce a foam having as good or better properties. This difference is of material economic importance when one considers that the isocyanate is by far the most expensive component in the manufacture of foam, since it costs more than twice as much per pound as even a pure glycerol initiated polyether. Thus a reduction of 15 percent in the amount of the expensive tolylene diisocyanate reflects itself in a materially lower cost foam.

Foamed rigid polyether-urethanes of the present invention are formed in accordance with what is now conventional practice for producing rigid urethane foams by reacting an aromatic isocyanate with the polyether composition in the presence of various adjuvants such as blowing agents, activators or catalysts, acid dispersing agents or emulsifiers. The foams can be made by the one-shot technique using either a volatile fluorocarbon or carbon dioxide generated by the reaction of water with diisocyanate as the blowing agent. The foams can also be produced by the quasi prepolymer technique wherein a quasi prepolymer is first prepared by reaction of isocyanate with a portion of the polyether and this quasi prepolymer subsequently admixed with additional polyether and adjuvants to form the foam.

Examples of suitable blowing agents for use in the present invention include carbon dioxide (produced by the in situ reaction of water and polyisocyanate) and preferably certain halogenated aliphatic saturated hydrocarbons. Mixtures of these can be and are sometimes used. The preferred blowing agents are characterized by being liquids or gases at normal temperatures and pressures, poor solvents for the resulting urethane foam, and boiling at temperatures below that generated by the polyurethane formation reaction. They, preferably, have a significant solubility in the aromatic polyisocyanate and when in the gaseous state they do not readily diffuse through the walls of closed cells of the rigid polyurethane foam. Such fluorocarbons are exemplified by the following specific compounds:

Monofluorotrichloromethane
Dichlorodifluoromethane
Monochlorotrifluoromethane
1,1-dichloro-2-fluoroethane
1,1-difluoroethane
1,1,2-trichloro-1,2,2-trifluoroethane The preferred isocyanate for use in the present invention is tolylene diisocyanate, preferably a mixture of isomers, because of its low cost and availability. Other aromatic isocyanates may also be employed, examples of which are diphenyl diisocyanate, triphenyl diisocyanate, chlorophenyl-2,4-diisocyanate, p-phenylene diisocyanate and p,p'-diisocyanate diphenylmethane.

The suitable activators or catalysts for use in preparing the foams described in this invention include (1) tertiary amine catalysts such as triethylamine, N-methylmorpholine, triethylenediamine, N,N,N',N'-tetramethyl-1,3-butane-diamine; (2) tertiary amines containing hydroxyl groups and capable of cross-linking the polyurethane, that is compounds such as those represented by the following general formula

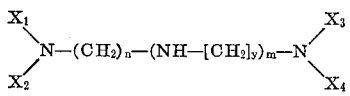

wherein $X_1$, $X_2$, $X_3$ and $X_4$ can be the same or different and are represented by the group, H-(O-alkylene)$_z$ in which z is an integer from 1 to 4, alkylene means a divalent aliphatic saturated hydrocarbon radical containing from 1 to 10 carbon atoms, also one of $X_1$, $X_2$, $X_3$ and $X_4$ can be an alkyl group containing up to 20 carbon atoms; n is an interger from 1 to 10, preferably 2 or 3; m is 0 or an integer from 1 to 3; and y is an integer from 1 to 10. Representative of such a class of compounds are the specific members tetra (hydroxyethyl) ethylene diamine, tetra (hydroxypropyl) ethylenediamine, the condensation product of propylene oxide and diethylenetriamine, (3) organo-tin compounds of the general formula

wherein X represents a hydrocarbon alkane radical of from 1 to 18 carbons, $R_1$, $R_2$ and $R_3$ represent a hydrocarbon alkane radical of from 1 to 18 carbons, hydrogen, halogen or a hydrocarbon acyl group, $R_1$, $R_2$ and $R_3$ being alike or different and further, two members of this group $R_1$, $R_2$ and $R_3$ together being oxygen or sulfur. Representative members of this group of organo-tin salts include the following specific compounds tetramethyltin
tetra-n-butyltin
tetra-octyltin
dimethyldioctyltin
triethyltinchloride
dioctyltindichloride
di-n-butyltindichloride
dilauryltindifluoride
2-ethylhexyltintriiodide
di-n-octyltin oxide
di-n-butyltindilaurate
di-n-butyltindiacetate
di-n-octyltin bis (monobutylmaleate)
di-2-ethylhexyltin bis (2-ethylhexanoate)
tri-n-butyltin acetonate
dibutyltin diacetate (4) organic tin salts, such as stannous octoate and stannous oleate.

These catalysts and/or accelerators and/or activators can be used alone or mixtures comprising one or more of the three types of substances can be utilized.

Examples of dispersing agents or emulsifiers conventionally used in this art include polyethylene oxide phenyl ethers, blends of polyalcohol carboxylic acid esters, oil soluble sulfonates, siloxane-oxyalkylene block copolymers and the like. The preferred emulsifiers for the purposes of the present invention are the siloxaneoxyalkylene block copolymers of the general formula

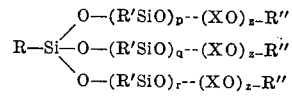

wherein R, R' and R'' are $C_{1-18}$ alkyl radicals; p, q and r are integers of from 2 to 15 and $—(XO)_z—$ is a polyoxyalkylene block where X is preferably an ethylene and/or propylene group resulting in polyoxyethylene-polyoxypropylene blocks containing from 10 to 50 of each oxyalkylene unit. Such siloxane-oxyalkylene block copolymers are commercially available, one such product being offered under the trade name designation of "Silicon L-520," in which above general formula $R=CH_3$, $R'=C_2H_5$, $R''=C_4H_9$, $p=q=r=7$ and the block

is a polyoxyethylene-polyoxypropylene block containing about 50 units of each oxyalkylene moiety.

In addition to the above mentioned conventionally used adjuvants, the rigid urthane foams known in the art may and usually do contain cross-linking agents, auxiliary blowing agents, pigments and the like. The formulation, curing and application treatments of compositions are well known to those skilled in this art to which the specific compositions of this invention pertain and accordingly no extended discussion of these well-known collateral aspects of the invention is deemed necessary.

The following examples illustrate the present invention.

EXAMPLE I

Into a reactor of about 1000 lb. capacity was charged 86.9 lb. of glycerol, 80 lbs. of sucrose, 4.1 lbs. of KOH and 5.5 lbs. of water and the charge heated to about 90° C. 104 lbs. of sucrose were added incrementally over a period of less than one hour while agitating the contents. 623 lbs. of propylene oxide were added over a period of about 10 hours and the temperature of the reaction mass was maintained at 100–120° C. at pressures up to 20 p.s.i.g. The reaction mass was cooled to 35° C. and neutralized with 25 percent aqueous HCl to a pH of 5. KCl precipitate was removed by filtering through a plate and frame filter press. The clear filtrate was heated to 110° C. and nitrogen gas was passed through the heated filtrate to remove the volatile constituents, particularly water. Stripping was continued until the product contained less than about 0.1 percent water. The resultant product had a hydroxyl number of 474 and a viscosity of 10,400 cps. at 25° C. The hydroxyl number is defined in milligrams of potassium hydroxide equivalent to the phthalic anhydride consumed in esterification of the (OH) groups in one gram of polyether. The test is a standard method known in the art and is defined in ASTM Tentative Methods of Testing Urethane Foam Raw Materials, D 1638–59T.

100 parts by weight of the above polyether composition was thoroughly stirred with 8.4 parts by weight of "Quadrol" a cross-linking agent which is tetrakis (hydroxypropyl) ethylenediamine, 1.2 parts by weight of emulsifying agent "L–520"—a silicone oil, 0.5 parts by weight of catalyst "D–22"—dibutyl tin dilaurate, 0.5 parts by weight of catalyst "DMEA"—dimethylethanolamine, and 43.1 parts by weight blowing agent "Genetron 11"—trichlorofluoroethane. A commercial tolylene diisocyanate (mixture of 2,4- and 2,6-isomers) containing 95 percent active ingredients was then mixed thoroughly in an amount of 104.8 parts by weight with the above mixture for a period of about 30 seconds. The foam was immediately poured into a mold of appropriate height and allowed to reach full height. It was permitted to age (cure) about 20 hours before testing. The resultant foam had the following properties. The density, expressed in pounds per cubic foot was advantageously low, namely 1.80. The primary shrinkage which is dimensional loss during cure of the foam was 1 percent. The friability which expresses the tendency to pulverize or "dust" with handling was advantageously low. Similarly the foam showed good compression and tear strengths. The dimensional stability, which is the percent of dimensional increase under hot humid conditions, i.e. during a 72 hour period at 70° C. in 100 percent relative humidity, was about 3 percent. Dimensional stability under hot dry conditions i.e. during 72 hours at 5 percent relative humidity at 70° C. was about 1 percent.

EXAMPLE II

A polyether composition was prepared as described above in Example I except that the proportion of constituents were 76 of glycerin, 4.1 lbs. of KOH, 5.5 lbs. water, 200 lbs. of sucrose and 659 lbs. of propylene oxide. The resultant polyether product had an hydroxyl number of 453 and a viscosity of 11,340 cps. at 25° C.

A polyurethane foam was prepared as described in Example I above employing the following ingredients in the following proportions; the parts are given by weight: 100 parts polyether composition; 8.4 parts "Quadrol"; 1.0 part "L–520"; 0.8 part "D–22"; 0.8 part "DMEA"; 42.2 parts "Genetron 11" and 99.8 parts of tolylene diisocyanate. The resultant foam had excellent characteristics with a density of 1.69 lbs. per cubic foot, no primary shrinkage, low friability, good compression and tear strengths and dimensional stability of 5 percent at 70° C. and 100 percent relative humidity.

EXAMPLE III

In another operation conducted in a manner similar to Example I, except that the reactor was a 6 foot glass column 6 inches in diameter, 2,071 grams of glycerin, 43 grams of potassium hydroxide, 63 grams of water, and 5,773 grams of sucrose were reacted with 17,146 grams of propylene oxide. The resultant product had a hydroxyl number of 459 and a viscosity of 16,900 cps. at 25° C.

The foam was produced by admixing 100 parts by weight of the polyether with 8.4 parts "Quadrol"; 1.0 part "L–520"; 0.6 part "D–22"; 0.6 part "DMEA"; 52.9 parts "Genetron 11" and 101.0 parts tolylene diisocyanate. The resultant foam had a density of 1.70 lbs. per cubic foot, primary shrinkage 2 percent, low friability, good compression and tear strengths and dimensional stability of 5 percent at 70° C. and 100 percent relative humidity.

EXAMPLE V

A polyether composition was prepared as described in Example I above by reaction of 200 lbs. sucrose, 76 lbs. glycerin, 487 lbs. propylene oxide in the presence of 4.1 lbs. potassium hydroxide and 5.5 lbs. water. A quasi prepolymer was prepared by charging tolylene diisocyanate to a vessel equipped with an agitator and adding the polyether over a period of 1 to 2 hours at such a rate that the temperature of the reaction mixture rose at a steady rate but did not exceed 80–85° C. The second half of the polyether charge was added at a rate which would maintain the reaction temperature at 70–80° C. After the polyether had been added the reaction mass was held at 70–85° C. for one hour and then cooled to room temperature. The resultant quasi prepolymer in which the tolylene diisocyanate:polyether equivalent ratio was 5.2:1 had a viscosity of 960 cps. at 24° C.

The polyether rigid foam was made by the following procedure in which parts are by weight: 100 parts of polyether, 1 part of triethylenediamine and 1 part of silicone emulsifier were mixed. To this was added another mixture consisting of 40 parts of trichloromonofluoromethane and 148 parts of the quasi prepolymer, previously prepared. The combined materials were then agitated for 25 seconds and poured into an appropriate mold. After an additional 50 seconds the foam had completely risen and it was tack free after an additional 10 seconds. The resultant foam had a density of 2.1 lbs. per cubic foot; compressive strength at 10 percent deflection of 42 p.s.i.; 94 percent closed cells and no change in the dimensions of the foam were observed after 24 hours at 70° C. dry heat; no change after 24 hours at −30° C.; no change after 24 hours at 110° C.; and no change after 3 days at 38° C. at 90–100 percent relative humidity. At 70° C. for 24 hours at 90–100 percent relative humidity, only 5 percent volume increase occurred.

The foams produced in accordance with the present invention had a fine, uniform cell structure. Generally more than 95 percent of the cells are closed. The foams, when subjected to the flame test, were found to be non-melting and non-dripping.

Although certain preferred embodiments of the invention have been disclosed for purpose of illustration, it will be evident that various changes and modifications may be made therein without departing from the scope and spirit of the invention.

We claim:

1. A method for the production of a sucrose polyol composition which comprises admixing sucrose with glycerol in the proportion of 550–210 parts by weight sucrose per 100 parts by weight glycerol, 0–1 percent water by weight of the reactants, passing propylene oxide in direct contact with said mixture of sucrose and glycerol in the presence of an alkali metal hydroxide catalyst while maintaining the reaction mixture at a temperature within the range of 50–150° C. and continuing the reaction until 1900–570 parts by weight propylene oxide per 100 parts by weight glycerol are reacted with the mixture of sucrose and glycerol to produce polyether containing an average 2.0–1.2 molecules propylene oxide reacted with each OH group of the sucrose and glycerol.

2. The method for the production of a sucrose polyol composition as defined in claim 1 wherein the proportion of sucrose to glycerol is 375–270 parts by weight sucrose per 100 parts by weight glycerol, the catalyst is potassium hydroxide, 1000–600 parts by weight propylene oxide per 100 parts by weight glycerol are reacted, and the polyether contains an average of 1.7–1.3 molecules propylene oxide reacted with each OH group of the sucrose and glycerol.

3. A sucrose polyol composition comprising the condensation product of a mixture comprising 210 to 550 parts by weight sucrose per 100 parts by weight glycerol and 570 to1900 parts by weight propylene oxide per 100 parts by weight glycerol, said polyol containing an average of 1.2 to 2.0 molecules propylene oxide reacted with each OH group of the sucrose and glycerol.

References Cited

UNITED STATES PATENTS

| | | | |
|---|---|---|---|
| 3,169,934 | 2/1965 | Dennett et al. | 260—209 |
| 3,222,357 | 12/1965 | Wismer et al. | 260—209 |
| 2,996,551 | 8/1961 | De Groote et al. | 260—209 |

LEWIS GOTTS, *Primary Examiner.*

J. R. BROWN, *Assistant Examiner.*

U.S. Cl. X.R.

260—2.5, 77.5